United States Patent
Carpenter et al.

(10) Patent No.: US 7,669,013 B2
(45) Date of Patent: Feb. 23, 2010

(54) DIRECTORY FOR MULTI-NODE COHERENT BUS

(75) Inventors: Gary Dale Carpenter, Austin, TX (US); Scott Douglas Clark, Rochester, MN (US); Bernard Charles Drerup, Austin, TX (US); Russell Dean Hoover, Rochester, MN (US); Charles Ray Johns, Austin, TX (US); David John Krolak, Rochester, MN (US); Prasanna Srinivasan, Apex, NC (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 11/828,439

(22) Filed: Jul. 26, 2007

(65) Prior Publication Data

US 2009/0031085 A1  Jan. 29, 2009

(51) Int. Cl.
*G06F 12/00* (2006.01)

(52) U.S. Cl. ...................................... 711/146; 711/141

(58) Field of Classification Search ...................... None
See application file for complete search history.

(56) References Cited

U.S. PATENT DOCUMENTS 6,405,289 B1    6/2002  Arimilli et al.
6,901,485 B2    5/2005  Arimilli et al.

*Primary Examiner*—Kevin Verbrugge
(74) *Attorney, Agent, or Firm*—Yee & Associates, P.C.; Jill A. Poimboeuf

(57) ABSTRACT

A method for maintaining cache coherency for a multi-node system using a specialized bridge which allows for fewer forward progress dependencies. A look-up of a local node directory is performed if a request received at a multi-node bridge of the local node is a system request. If a directory entry indicates that data specified in the request has a local owner or local destination, the request is forwarded to the local node. If the local node determines that the request is a local request, a look-up of the local node directory is performed. If the directory entry indicates that data specified in the request has a local owner and local destination, the coherency of the data on the local node is resolved and a transfer of the request data is performed if required. Otherwise, the request is forwarded to all remote nodes in the multi-node system.

20 Claims, 4 Drawing Sheets

DIRECTORY FOR MULTI-NODE COHERENT BUS

BACKGROUND OF THE INVENTION

1. Field of the Invention

The present invention relates generally to an improved data processing system, and in particular to a computer implemented method, data processing system, and computer program product for maintaining cache coherency for a multi-node system using a specialized bridge which allows for fewer forward progress dependencies.

2. Description of the Related Art:

A multi-processing system comprises a plurality of central processing units within a single computer system. A multi-processing system often contains 8 to 256 processing elements, wherein the processing elements are organized into groups called "nodes". FIG. 1 provides an illustration of an example node 102. Node 102 is shown to comprise processing elements 104 and 106. A "processing element" is one logical attachment point to the bus, often having 200 to 500 wires, and typically consists of one shared Level2 cache 108 to which one or more processors are attached. Each processor within a processing element typically has its own non-shared Level1 cache, such as processor 110 and Level1 cache 112. Each Level1 cache is logically placed between the processor and Level2 cache 108.

A node is typically 4 to 16 processing elements and a system is typically 2 to 16 nodes. The nodes are organized into two levels of hierarchy. At the bottom level of the hierarchy is a node with typically 5 to 20 devices attached to it, 4 to 16 of which are processing elements and the rest are memory controllers and I/O bridges. A node has one bus controller 114 which contains the bus arbiter(s). The top level of the hierarchy is an interconnection of multiple nodes. Note that both levels of hierarchy may be implemented with other hierarchies of buses.

Since a cache is a local copy of a portion of memory, a processor can access a cache more quickly than memory to enhance performance. However, because processors in a multi-processing system can share data, the processors can access the same data fields and the same portions of memory. This access includes writing to the data, which can change the content of the memory. Consequently, if a processor has a local copy of data and another processor writes to the data in memory, there must be some mechanism to ensure that the local copy of data that is cached is updated to reflect the write.

Cache coherency is a process for ensuring that local caches of data are kept current and up-to-date while other processors may be writing to the data in memory. Snooping is a common mechanism for maintaining cache coherency. Snooping comprises a process which is initiated any time there is a read or write to memory. Read and write transactions have two phases on the bus—a command phase and a data phase. The command phase includes information such as the address, the length of the transaction, and command type (e.g., read or write), while the data phase includes the contents of the associated address. When snooping, the command portion (address portion) of the read or write is looked up in the cache, rather than the data portion. If the command portion and the cache have a same location in memory, a resolution process is initiated to ensure all devices have a consistent view of the data.

SUMMARY OF THE INVENTION

The illustrative embodiments provide a computer implemented method, data processing system, and computer program product for maintaining cache coherency for a multi-node system using a specialized bridge which allows for fewer forward progress dependencies. Responsive to receiving a request at a multi-node bridge of a local node, a look-up of a directory in the local node is performed if the request is a system request. If an entry in the directory of the local node indicates that data specified in the request has a local owner or the request has a local destination, the request is forwarded to the local node. At the local node, a determination is made as to whether the request is a local request or a system request. If the local node determines that the request is a local request, a look-up of the directory in the local node is performed. If the entry in the directory of the local node indicates that data specified in the request has a local owner and the request has a local destination, the coherency of the data on the local node is resolved and a transfer of the data specified in the request is performed if a data transfer is required. If the entry in the directory of the local node indicates that data specified in the request does not have a local owner or the request does not have a local destination, the request is forwarded to all remote nodes in the multi-node system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
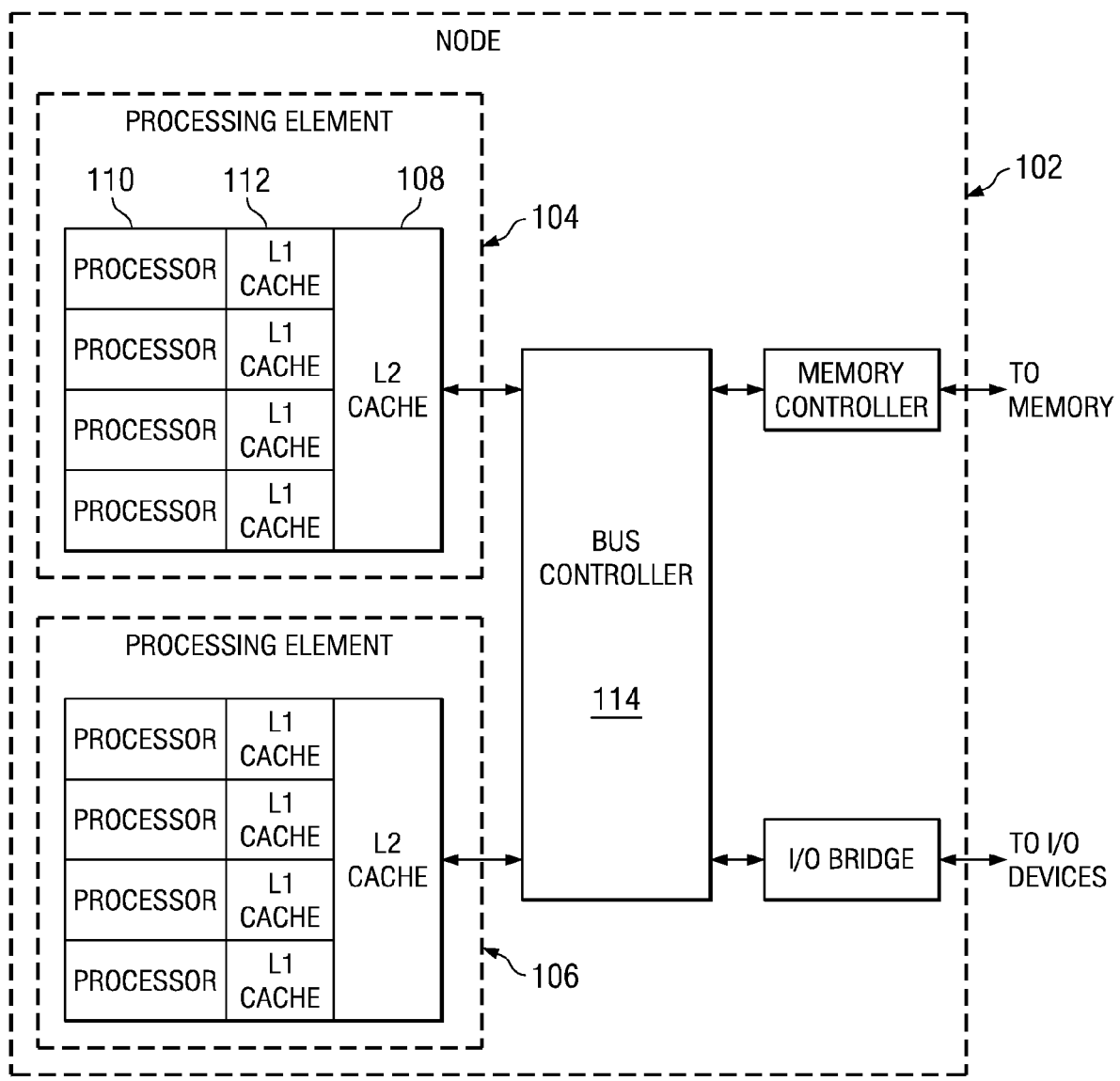
FIG. 1 is block diagram of an example node in a multi-processor system.
Figure 2:
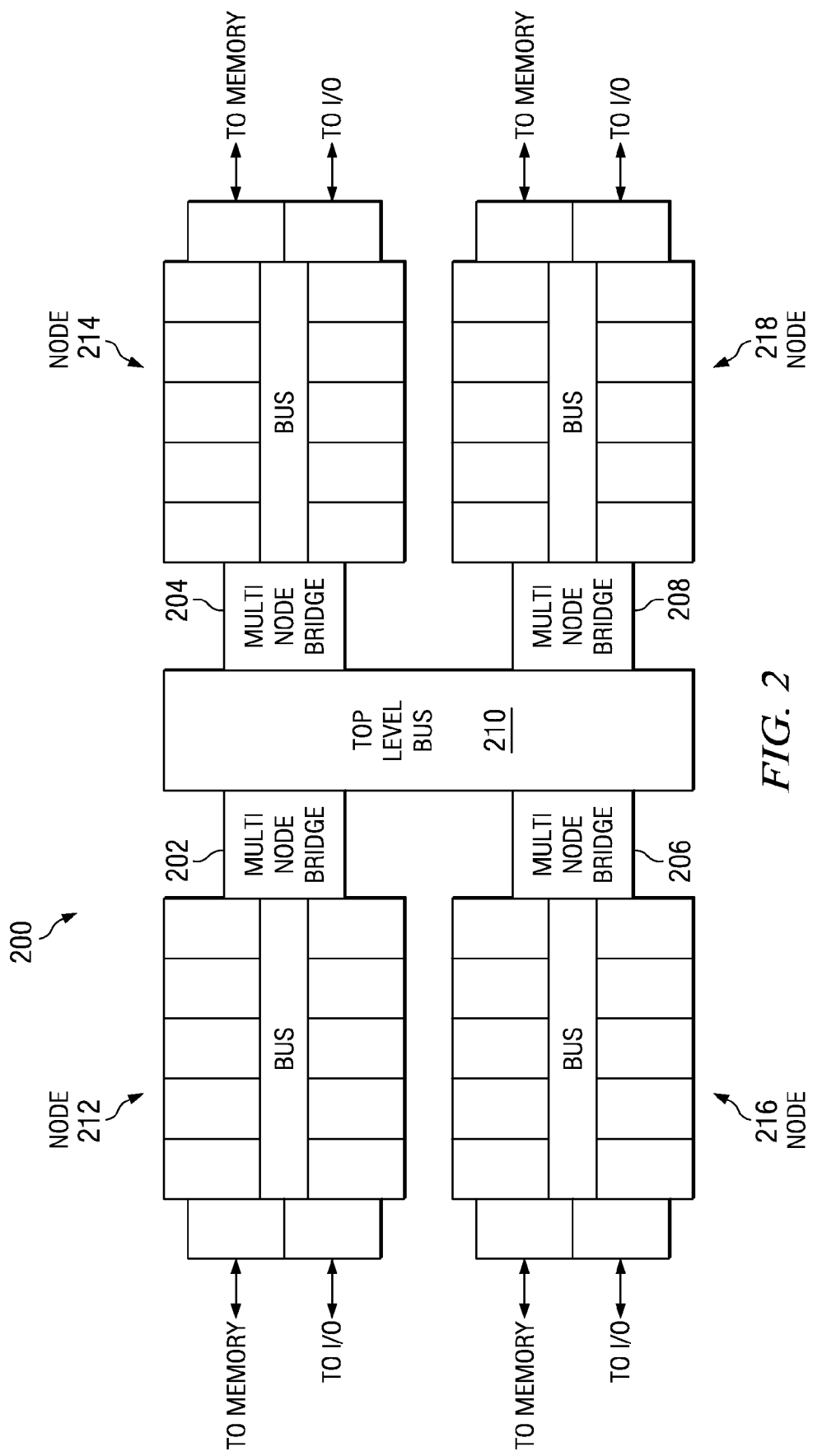
FIG. 2 is a high level block diagram of an exemplary multi-node system interconnected by one top-level bus.

A "multi-node bridge" (MN Bridge) is shown in FIG. 2. FIG. 2 is a high level block diagram of an exemplary multi-node system 200 interconnected by one top-level bus. In this illustrative example, a four node system is shown. Each multi-node bridge, such as multi-node bridge 202, 204, 206, or 208, interconnects one of the nodes to top-level bus 210. Typically, the only devices on the top-level bus are multi-node bridges, and each node has one multi-node bridge. For example, nodes 212, 214, 216, and 218 are interconnected to top-level bus 210 by multi-node bridges 202, 204, 206, and 208, respectively. Each node 212, 214, 216, and 218 may comprise various processing elements (processors and caches), as well as a bus control, memory controller, and an input/output bridge, such as node 102 in FIG. 1.

A current implementation of multi-node systems is disclosed in U.S. Pat. No. 6,405,289, entitled "Multiprocessor System In Which A Cache Serving As A Highest Point Of Coherency Is Indicated By A Snoop Response" issued to Arimilli et al. on Jun. 11, 2002 and assigned to International Business Machines Corporation (hereinafter referred to as "the '289 patent"), which is herein incorporated by reference in its entirety. This implementation includes the ability for cache lines (a segment of address space typically 32, 64, 128 or 256 bytes in size) of any memory to be held by any cache within the system, including multiple caches. The '289 patent also includes the mechanisms and protocols to maintain coherency for these cache lines. For instance, read and write transactions have two phases on the bus—a command phase and a data phase. The command phase includes information such as the address and the length of the transaction, while the data phase includes the contents of the associated address.

In the '289 patent implementation, coherent requests comprise the "command" portion of a transaction. The coherent requests from a master are snooped locally or snooped globally. Snooping a request locally means that since only caches on the local node have a copy of the data, the request is snooped on the node of the master that originated the request. Snooping a request globally means that since at least one cache line, or at least one cache, somewhere outside the current node has a copy of the data, so the request is snooped by all nodes. Only a small percentage of requests are global; most of the requests are local. Requests that are determined to be global are forwarded by the multi-node bridge from the local bus to the top-level bus, where the requests are broadcast to all the other nodes in the system. Only the command portion of transaction is broadcast and snooped. The data portion of the transaction is delivered point-to-point.

The determination of whether to snoop locally or globally is made in the '289 patent based on information from either memory or the caches (cache states). Each node contains a table in memory, and the table's content may also be partially held within the cache. The table indicates whether portions of memory space, the portions being cache lines, are local or global, and is updated each time the state changes from local to global or global to local. So, if the cache line is accessed from a remote node, the cache line is marked as global in that table so that the system would know some remote device has the cache line.

However, a cache line marked as global in the table may actually no longer be global. In other words, a cache line may have been discarded from the cache because the processing element which read the cache line did not actually modify the cache line. In this case, when the global snooping process is run for the cache line whereby each remote bus is snooped, all of the remote devices would return an answer that the cache line is not owned. The table may then be updated to reflect that the cache line is now locally owned. Thus, the first time a cache line which is no longer global is referenced, the cache line must still be snooped globally.

A different protocol for building multi-node systems is called Cache Coherent-Non Uniform Memory Architecture, or "CC-NUMA". The structure of buses and multi-node bridges is the same in CC-NUMA as in the multi-node system in the '289 patent. However, there are differences in the protocols each system implements. With a CC-NUMA protocol, the determination of which caches hold cache lines is not within memory or the caches, but within a separate "directory". Referring to the multi-node system in FIG. 2, each multi-node bridge 202, 204, 206, and 208 would logically contain one directory. The directory has some similarity to the table in the '289 patent, except that the directory contains more detail about the cache lines. Additional background details may be found in U.S. Pat. No. 6,901,485 entitled "Memory Directory Management In A Multi-Node Computer System" and issued to Arimilli et al. on "May 31, 2005" and assigned to International Business Machines Corporation (hereinafter referred to as "the '485 patent"), which is herein incorporated by reference in its entirety.

A directory is a table that has entries that indicate which caches hold a given cache line. Each directory contains entries associated with the memory on the same nodes as the directory. To limit their area, directories are typically implemented with a cache-like structure, such that they only hold entries for a subset of all the cache lines in the system. As a consequence, most cache lines have no entry in the directory.

For each request on a given node's local side, if the address of the request is within the address space of the memory of the local node, a look-up of the directory is performed. If the directory entry indicates a remote cache holds the line, the multi-node bridge forwards the request (or a similar flush request) as a snoop to the destination node or nodes.

For each request on a given node's local side, if the address of the request is within the address space of a memory on a remote node, then the request is forwarded to the remote node by the multi-node bridge without a directory look-up. The snoop request may cause a castout transaction (write-back transaction) to occur. A castout transaction applies to a cache that has modified data (i.e., the cache has been written to). In the castout, the cache writes back to memory or to the device that requested the data.

A request on a given node may have originated from a remote node where the remote node determined the address space to be within the given node. As with locally originating requests to local memory space, such requests cause a directory look-up, which leads to a remote snoop if the directory entry indicates a remote cache holds the cache line. This may result in up to three "hops" for such requests (command results and data hops not included). Consider a worst case example illustrating the three "hops" of CC-NUMA:

1. Originating request on Node1 has an address assigned to Node2. Node1 forwards the request to Node2.
2. The request on Node2 causes a directory look-up. The directory entry indicates the cache line is held on Node3. Node2 forwards the request to Node3.
3. The snoop on Node3 causes a castout transaction. The castout is forwarded to Node2.

In the first step, a multi-node bridge forwards requests from the local side (Node1) to the "system side" when the address of the request is in the address space of a memory on a remote node. Thus, if a processor initiates a request on a given node, but that request is not to local memory (Node1 memory) but instead to remote memory, then the multi-node bridge forwards the request to that remote node. No directory look-up is performed in this step because as each directory contains references to only its local memory, that particular node would not have any information about the request. In the second step, Node2 receives the request. In this case, a directory look-up is performed on Node2, since the address of the request is to the local side (Node2). If the directory entry from the look-up indicates the cache line is remotely held, the multi-node bridge then forwards the request from the local side (Node2) as a snoop to the "system side". In the third step, Node3, as part of its cache coherency maintenance, causes a castout transaction back to Node2, which looks to be the location of the memory.

The directory maintains inclusivity with all remote caches. Inclusivity is a property of a directory (or cache). Inclusivity means that every line within a specified range of memory held by the associated caches (in this case, all remote caches) contains an entry in the directory. Thus, a request that misses in the directory is guaranteed to not be held in any remote cache, and thus need not be remotely snooped. However, this property adds complexity to the control logic of the directory for the case where a new entry is added in the directory. A new entry typically evicts (causes the deletion of) an old entry that is valid. Before the old entry can be deleted, the directory must send a flush transaction to the caches indicated by the old entry, so that inclusivity is maintained.

In summary, the local/global mechanism in the '289 patent keeps track of which cache lines are local or global, and if any remote device has a copy of the line (global), each remote node is snooped to achieve cache coherency. However, since a global request must be forwarded to every node, the local/global mechanism may experience performance issues as the number of nodes gets larger. In the CC-NUMA mechanism, each node has some local memory and a directory, and the directory indicates precisely the caches of which remote nodes have copies of a portion of the memory, so only those caches are snooped to achieve cache coherency. However, the CC-NUMA mechanism is extremely complex due to the forward progress dependencies on the three hops explained above. For instance, forward progress dependencies are present in the three hops as a current hop must be resolved before the next hop may be processed. Multiple crossings of the multi-node bridge must occur in order to ensure that each hop in the sequence may be resolved. Since there are numerous transactions in flight simultaneously, and since there may be limited capability (e.g., limited buffer) in the system to forward transactions across the bridge, the buffer may be filled with in-flight transactions prior to processing the entire sequence. Although there are mechanisms in the art for resolving these forward progress dependency issues, these current mechanisms require a lot of logic to ensure forward progress, and thus they may require a large development effort.

The illustrative embodiments provide a mechanism that comprises the functionality as the local/global and CC-NUMA mechanisms, but does so in a manner that is less complex and with improved performance. The illustrative embodiments employ elements from both CC-NUMA and local/global mechanisms to provide an improved method for maintaining cache coherency for a multi-node system using a specialized bridge which allows for fewer forward progress dependencies. In particular, two methods are provided in the illustrative embodiments for multi-node systems. Both methods use directories, similar to the CC-NUMA mechanism, rather than using space within memory or caches like the local/global mechanism. However, both methods also use the local/global mechanism to reduce the number of request "hops" to two (unlike CC-NUMA).

The illustrative embodiments provide a specialized multi-node bridge containing a directory for use in a multi-node system. Like a CC-NUMA directory, this directory in the specialized multi-node bridge also contains entries for every cache line of local memory space that is remotely owned. In other words, the directory in the illustrative embodiments is inclusive of remote caches. Optionally, the directory may also include entries for remote memory spaces that are held by only local caches. This flexibility allows local requests to these entries to be locally completed by intervention. The specialized multi-node bridge performs a directory look-up for all locally-originating requests. Unlike the CC-NUMA mechanism, however, the specialized multi-node bridge does not perform a look-up on requests that come from the system side. The specialized multi-node bridge forwards all local-side requests whose directory look-up indicates a remote owner to the system side. All system-side requests in the illustrative embodiments are treated as "global" requests, meaning that these requests are broadcast to all nodes. The specialized multi-node bridge forwards all system-side requests to its local side, except those requests initiated by itself.

Unlike CC-NUMA, the specialized multi-node bridge in the illustrative embodiments never forwards requests that began on the system side to the system side. Such requests are not forwarded because all system-side requests are already broadcast to all nodes, and thus the requests are already being sent to every remote destination. By not forwarding all system-side requests to the system side, the specialized multi-node bridge allows for a maximum of two "hops" for requests in a worst case scenario, as compared to three "hops" for the CC-NUMA mechanism. Consider the following example:

1. Originating request on Node1 has an address assigned to Node2. Broadcast request to all other nodes (including Node2 and Node3).
2. The snoop on Node3 causes a castout transaction. The castout is forwarded to Node2.

Thus, the method described in the illustrative embodiments results in a simpler cache coherency implementation with fewer forward progress dependencies than CC-NUMA. The reduced number of hops also reduces maximum latency as long as the buses throughout the system are lightly utilized. Handling a request as global, whereby it is distributed and snooped by every node, makes the solutions described in the illustrative embodiments practical for a system with a limited number of nodes (e.g., 8 to 16 nodes). The method also does not require storing local/global information within local memory or caches, which allows for decreasing latency and simpler, smaller caches.

The illustrative embodiments also provide an alternative embodiment for maintaining cache coherency. This alternative embodiment comprises a reversed directory mechanism which comprises an alternate directory and bridge structure that may provide better or worse performance than the other embodiment, depending upon the particular application. The reverse directory mechanism method operates by having entries in the directory which indicate that a cache line is locally owned. It should be noted that other known directory mechanisms operate by having entries in the directory that indicate that a cache line is remotely owned. It should also be noted that since caches typically hold only a small percentage of the total memory contents, the reverse directory mechanism method may miss the cache more frequently than other known directory mechanisms in many applications, which may result in reduced performance.

The multi-node bridge in the reverse directory mechanism method performs a directory look-up before forwarding a system-side request to the local side. This directory look-up requires the multi-node bridge to arbitrate local-side vs. system-side requests into the directory. However, if a system-side request misses in the directory, the system-side request is not forwarded to the local side. Also, local-side requests that originated from the system side (initiated on the local bus by the multi-node bridge) are not looked up in the directory, since a look-up has already been performed.

An advantage of the reverse directory mechanism method is that replacement of a directory entry only requires a flush to the local node, rather than flushing all (possibly several) of the remote nodes. A second advantage is that global requests on the system bus are only forwarded to one or zero nodes (not to all nodes). It should be noted that a "zero nodes" case occurs when a request accesses an address that is not cached anywhere but is located in the memory space of the processing element that initiated the request. Since requests forwarded to the system-side bus need not be sent to all nodes, some applications may perform better and consume less power. It should also be noted that this reverse directory mechanism method uses the local/global mechanism to limit the maximum number of "hops" for a request to two.

Figure 3:
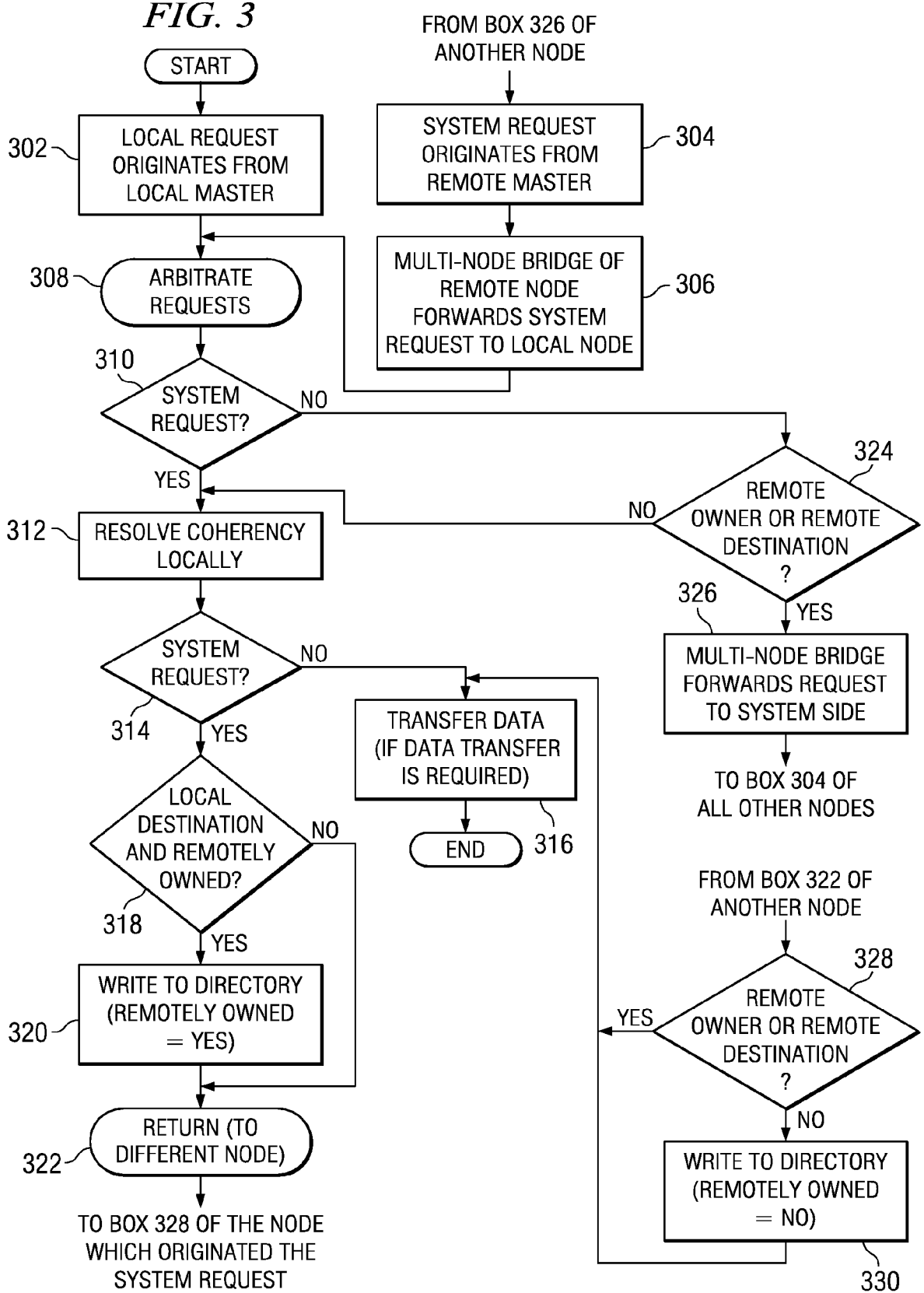
FIG. 3 is a flowchart of a process for maintaining cache coherency for a multi-node system using a specialized bridge which allows for fewer forward progress dependencies in accordance with the illustrative embodiments.

FIG. 3 is a flowchart of a process for maintaining cache coherency for a multi-node system using a specialized bridge which allows for fewer forward progress dependencies in accordance with the illustrative embodiments. The process in FIG. 3 illustrates the path followed by a given node. The process described in FIG. 3 may be implemented in a multi-node system, such as multi-node system 200 in FIG. 2.

The process begins when a local request originates from a local master (step 302). A system request which is received from another node (remote master) (step 304) is forwarded across the multi-node bridge of the local node (step 306). The bus controller of the local node arbitrates the local request and the system request (step 308). The arbitration comprises a serialization function which grants either the local request or the system request.

After the bus controller selects either the local request or the system request, the multi-node bridge makes a determination as to whether the selected request is a system request (step 310). The request is a system request if the request originated from another node. If the request is a system request ('yes' output of step 310), the bus controller resolves the coherency locally (step 312). Resolving the coherency locally may include snooping all of the devices on the node, determining if any of the snoopers have a modified copy of the data, generating a castout, and ensuring the castout reaches its destination. The multi-node bridge then makes another determination as to whether the request is a system request (step 314). If the request is not a system request ('no' output of step 314), the bus controller may perform a data transfer if a data transfer is required (step 316), with the process terminating thereafter. The data transfer may comprise moving read data from the destination node to the master that initiated the request, or moving write data from the master that originated the request to the destination node.

Turning back to step 314, if the request is a system request ('yes' output of step 314), the multi-node bridge determines if the destination in the request is local (i.e., the local node) and if the request is remotely owned (step 318). This determination may be made by comparing the address of the request to the range that is on the local node. If the request is local and remotely owned ('yes' output of step 318), the multi-node bridge first writes to its directory that the data is remotely owned (remotely owned=yes) (step 320). The process then returns the request (including the request ownership for the local node that was determined while snooping in step 312 and the destination information) back to the remote node which originated the system request (step 322) and continues to step 328. If the request does not contain a local destination or is not remotely owned ('no' output of step 318), the process returns the request (including the request ownership for the local node that was determined while snooping in step 312 and the destination information) back to the remote node which originated the system request (step 322) and continues to step 328.

Turning back to step 310, if the request is not a system request ('no' output of step 310), the multi-node bridge performs a directory look-up to determine if the data is remotely owned or if the request contains a remote destination (step 324). Data is remotely owned if the data is located in the cache of a processing element of a remote node. A request contains a remote destination if the destination address in the request specifies a remote node as the target of the request. If the data is not remotely owned and the request does not contain a remote destination ('no' output of step 324), the process skips to step 312.

If the data is remotely owned or the request contains a remote destination ('yes' output of step 324), the multi-node bridge forwards the request to the system side (step 326). Forwarding the request to the system side comprises broadcasting the request in a global manner to all nodes. This system request may be processed by each node in a manner similar to the process of the given local node in this example, such that each of the nodes receives the request as a system request in step 304. As the process shown in FIG. 3 continues on each node, if the process hits the return step 322, the system request is returned to the node which originated the request (in this particular example, the given local node is the node which originated the system request).

When the global request is received by a multi-node bridge of a different node, the multi-node bridge makes a determination whether the request is remotely owned or if the request contains a remote destination (step 328). In this step, the process is acting on the "system" request. If the request was returned from step 322, the multi-node bridge in step 328 examines the ownership information and the destination information returned with the request from step 322. If the multi-node bridge determines that the request is remotely owned or contains a remote destination ('yes' output of step 328), the bus controller may perform a data transfer if a data transfer is required (step 316), with the process terminating thereafter. If the request is not remotely owned and does not contain a remote destination ('no' output of step 328), the multi-node bridge writes to its directory that the data is not remotely owned (remotely owned=no) (step 330). The bus controller may then perform a data transfer if a data transfer is required (step 316), with the process terminating thereafter.

Figure 4:
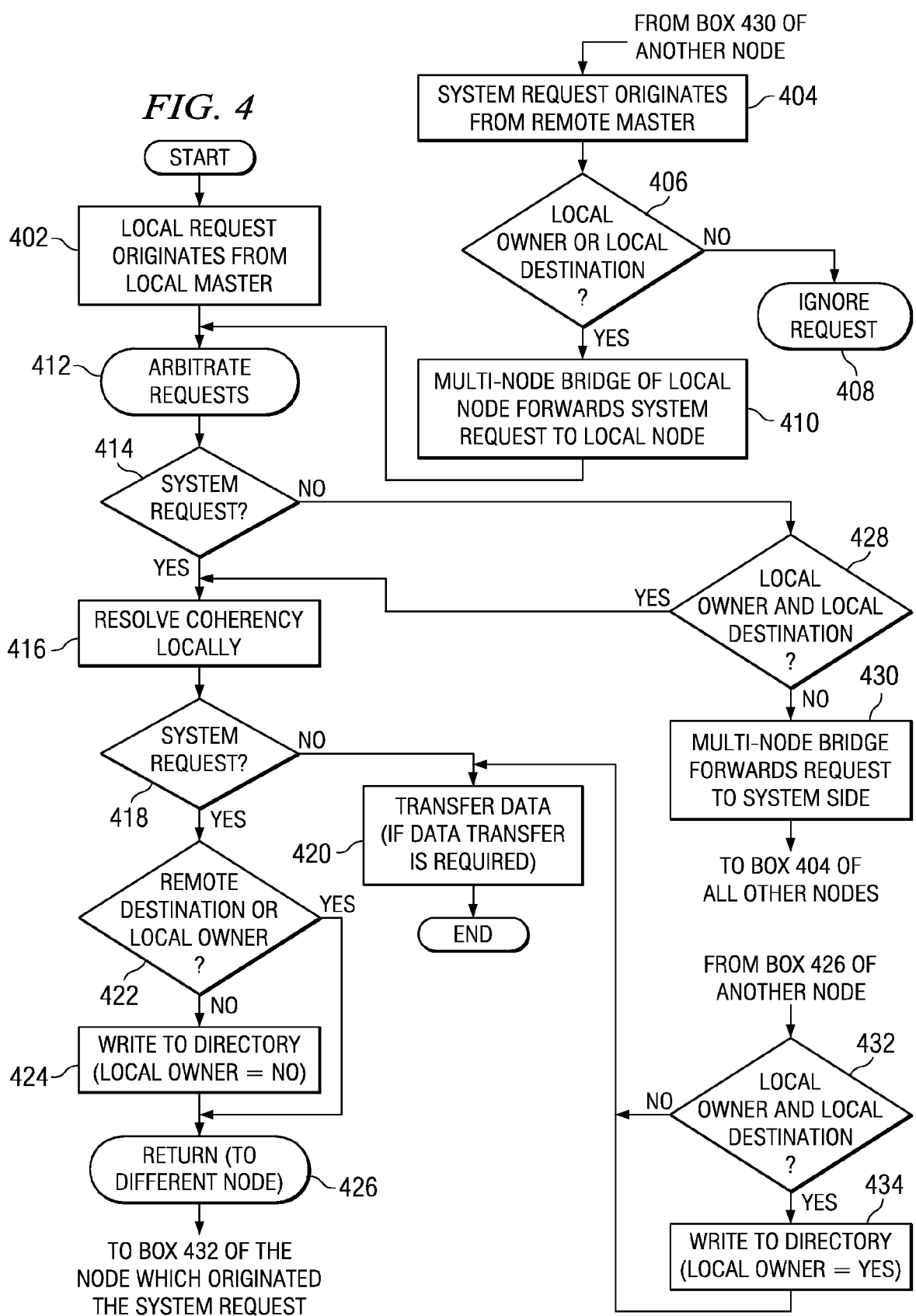
FIG. 4 is a flowchart of an alternative process for maintaining cache coherency for a multi-node system using a specialized bridge which allows for fewer forward progress dependencies in accordance with the illustrative embodiments.

FIG. 4 is a flowchart of an alternative process for maintaining cache coherency for a multi-node system using a specialized bridge which allows for fewer forward progress dependencies in accordance with the illustrative embodiments. The process described in FIG. 4 may be implemented in a multi-node system, such as multi-node system 200 in FIG. 2.

The process begins when a local request originates from a local master (step 402). When a system request originates from another node (remote master) (step 404), a determination is made by the multi-node bridge of the local node as to whether the data requested is locally owned or has a local destination by doing a directory look-up (step 406). If the data is not locally owned or does not have a local destination ('no' output of step 406), the request is ignored (step 408). If the data is locally owned or has a local destination ('yes' output of step 406), the system request is forwarded across the multi-node bridge of the local node (step 410). The bus controller of the local node then arbitrates the local request and the system request (step 412).

After the bus controller selects either the local request or the system request in the arbitration, the multi-node bridge determines if the request is a system request (step 414). The request is a system request if the request originated on another node. If the request is a system request ('yes' output of step 414), the multi-node bridge resolves the coherency locally (step 416). The multi-node bridge then makes another determination as to whether the request is a system request (step 418). If the request is not a system request ('no' output of step 418), the bus controller may perform a data transfer if a data transfer is required (step 420), with the process terminating thereafter.

Turning back to step 418, if the request is a system request ('yes' output of step 418), the multi-node bridge determines if the destination in the request is remote (i.e., a remote node) or if the request is locally owned (step 422). This determination may be made by comparing the address of the request to the range that is located on the local node. If the request does not contain a remote destination or if the request is not locally owned ('no' output of step 422), the multi-node bridge first writes to its directory that the data is not locally owned (locally owned=no) (step 424). The process then returns the request (including the request ownership within the local node that was determined while snooping in step 416 and the destination information) back to the remote node which originated the system request (step 426) and continues to step 432. If the request contains a remote destination or if the request is locally owned ('yes' output of step 422), the process returns the request (including the request ownership within the local node that was determined while snooping in step 416 and the destination information) back to the remote node which originated the system request (step 426) and continues to step 432.

Turning back to step 414, if the request is not a system request ('no' output of step 414), the multi-node bridge performs a directory look-up to determine if the data is locally owned and if the request contains a local destination (step 428). Data is locally owned if the data is located only in the caches of processing elements of the local node. A request contains a local destination if the destination address in the request specifies the local node as the target of the request. If the data is locally owned and if the request contains a local destination ('yes' output of step 428), the process skips to step 416.

If the data is not locally owned or if the request does not contain a local destination ('no' output of step 428), the multi-node bridge forwards the request to the system side (step 430). Forwarding the request to the system side comprises broadcasting the request in a global manner to all nodes. This system request may be processed by each node in a manner similar to the process of the given local node in this example, such that each of the nodes receives the request as a system request in step 404. As the process shown in FIG. 4 continues on each node, if the process hits the return step 426, the system request is returned to the node which originated the request (in this particular example, the given local node is the node which originated the system request).

When the global request is received by a multi-node bridge of a different node, the multi-node bridge makes a determination whether the request is locally owned and contains a local destination (step 432). If the request is not locally owned and does not contain a local destination ('no' output of step 432), the bus controller may perform a data transfer if a data transfer is required (step 420), with the process terminating thereafter. If the request is locally owned and contains a local destination ('yes' output of step 432), the multi-node bridge writes to its directory that the data is locally owned (locally owned=yes) (step 434). The bus controller may then perform a data transfer if a data transfer is required (step 420), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for maintaining cache coherency in a multi-node system, the computer implemented method comprising:
responsive to receiving a request at a multi-node bridge of a local node, performing a look-up of a directory in the local node if the request is a system request;
if an entry in the directory of the local node indicates that data specified in the request has a local owner or the request has a local destination, forwarding the request to the local node;

determining, at the local node, whether the request is a local request or a system request;

responsive to the local node determining that the request is a local request, performing a look-up of the directory in the local node;

if the entry in the directory of the local node indicates that data specified in the request has a local owner and the request has a local destination, resolving coherency of the data on the local node and performing a transfer of the data specified in the request if a data transfer is required; and if the entry in the directory of the local node indicates that data specified in the request does not have a local owner or the request does not have a local destination, forwarding the request to all remote nodes in the multi-node system.

2. The computer implemented method of claim 1, further comprising:

responsive to resolving coherency of the data on the local node, determining if the request is a system request;

if the request is a system request, determining if the request has a remote destination or a local owner;

if the data specified in the request has a remote destination or a local owner, returning the request to a remote node which originated the request; and if the data specified in the request does not have a remote destination and does not have a local owner, updating the directory of the local node to indicate that the request is not locally owned and returning the request to the remote node which originated the request.

3. The computer implemented method of claim 2, further comprising:

responsive to receiving the returned request at the remote node, checking ownership information and destination information in the request to determine, at that remote node, if the request has a local owner and a local destination;

if the request does not have a local owner or a local destination, performing a transfer of the data specified in the request if a data transfer is required; and if the request has a local owner and a local destination, updating the directory of the remote node to indicate that the request is owned by the local node and performing a transfer of the data specified in the request if a data transfer is required.

4. The computer implemented method of claim 1, wherein resolving coherency of the data on the local node includes snooping all devices on the local node, determining whether any snoopers have a modified copy of the data, generating a castout, and ensuring the castout reaches its destination node.

5. The computer implemented method of claim 1, wherein a local request is a request originating from a local owner.

6. The computer implemented method of claim 1, wherein a system request is a request originating from a remote owner, and wherein the request originating from the remote owner is a consequence of a multi-node bridge on the remote node forwarding the request to all other nodes in the multi-node system.

7. The computer implemented method of claim 1, wherein the directory in the local node includes entries for local memory space held by local caches.

8. The computer implemented method of claim 1, wherein the directory in the local node includes entries for remote memory spaces held only by local caches.

9. The computer implemented method of claim 1, wherein the look-up of the directory is performed for all local and all system requests.

10. The computer implemented method of claim 1, wherein the look-up of the directory is not performed for any system requests.

11. A data processing system for maintaining cache coherency in a multi-node system, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to perform, in response to receiving a request at a multi-node bridge of a local node, a look-up of a directory in the local node if the request is a system request; if an entry in the directory of the local node indicates that data specified in the request has a local owner or the request has a local destination, forward the request to the local node; determine, at the local node, whether the request is a local request or a system request; perform a look-up of the directory in the local node in response to the local node determining that the request is a local request; if the entry in the directory of the local node indicates that data specified in the request has a local owner and the request has a local destination, resolve coherency of the data on the local node and perform a transfer of the data specified in the request if a data transfer is required; and if the entry in the directory of the local node indicates that data specified in the request does not have a local owner or the request does not have a local destination, forward the request to all remote nodes in the multi-node system.

12. The data processing system of claim 11, wherein the processing unit executes the computer usable code to determine if the request is a system request in response to resolving coherency of the data on the local node; if the request is a system request, determine if the request has a remote destination or a local owner; if the data specified in the request has a remote destination or a local owner, return the request to a remote node which originated the request; and if the data specified in the request does not have a remote destination and does not have a local owner, update the directory of the local node to indicate that the request is not locally owned and return the request to the remote node which originated the request.

13. The data processing system of claim 12, wherein the processing unit executes the computer usable code to check ownership information and destination information in the request in response to receiving the returned request at the remote node to determine, at that remote node, if the request has a local owner and a local destination; if the request does not have a local owner or a local destination, perform a transfer of the data specified in the request if a data transfer is required; and if the request has a local owner and a local destination, update the directory of the remote node to indicate that the request is owned by the local node and perform a transfer of the data specified in the request if a data transfer is required.

14. A computer program product for maintaining cache coherency in a multi-node system, the computer program product comprising:

a computer usable medium having computer usable program code tangibly embodied thereon, the computer usable program code comprising:

computer usable program code for performing, in response to receiving a request at a multi-node bridge of a local node, a look-up of a directory in the local node if the request is a system request;

computer usable program code for forwarding the request to the local node if an entry in the directory of the local node indicates that data specified in the request has a local owner or the request has a local destination;

computer usable program code for determining, at the local node, whether the request is a local request or a system request;

computer usable program code for performing a look-up of the directory in the local node in response to the local node determining that the request is a local request;

computer usable program code for resolving coherency of the data on the local node if the entry in the directory of the local node indicates that data specified in the request has a local owner and the request has a local destination and performing a transfer of the data specified in the request if a data transfer is required; and computer usable program code for forwarding the request to all remote nodes in the multi-node system if the entry in the directory of the local node indicates that data specified in the request does not have a local owner or the request does not have a local destination.

15. The computer program product of claim 14, further comprising:

computer usable program code for determining if the request is a system request in response to resolving coherency of the data on the local node;

computer usable program code for determining, if the request is a system request, if the request has a remote destination or a local owner;

computer usable program code for returning the request to a remote node which originated the request if the data specified in the request has a remote destination or a local owner; and computer usable program code for updating the directory of the local node if the data specified in the request does not have a remote destination and does not have a local owner to indicate that the request is not locally owned and returning the request to the remote node which originated the request.

16. The computer program product of claim 15, further comprising:

computer usable program code for checking ownership information and destination information in the request in response to receiving the returned request at the remote node to determine, at that remote node, if the request has a local owner and a local destination;

computer usable program code for performing a transfer of the data specified in the request if a data transfer is required if the request does not have a local owner or a local destination; and computer usable program code for updating the directory of the remote node if the request has a local owner and a local destination to indicate that the request is owned by the local node and performing a transfer of the data specified in the request if a data transfer is required.

17. The computer program product of claim 14, wherein the directory in the local node includes entries for local memory space held by local caches.

18. The computer program product of claim 14, wherein the directory in the local node includes entries for remote memory spaces held only by local caches.

19. The computer program product of claim 14, wherein the look-up of the directory is performed for all local and all system requests.

20. The computer program product of claim 14, wherein the look-up of the directory is not performed for any system requests.

* * * * *